United States Patent [19]

Gibson

[11] 4,283,741
[45] Aug. 11, 1981

[54] SIGNAL SEPARATION NETWORKS

[75] Inventor: Walter G. Gibson, Princeton, N.J.

[73] Assignee: RCA Corporation, New York, N.Y.

[21] Appl. No.: 85,311

[22] Filed: Oct. 26, 1979

[51] Int. Cl.³ .......................... H04N 5/62; H04N 5/60
[52] U.S. Cl. ...................................... 358/197; 358/196
[58] Field of Search ................. 358/196, 197, 38, 188; 333/132, 175, 176

[56] References Cited

U.S. PATENT DOCUMENTS

| | | | |
|---|---|---|---|
| 2,504,662 | 4/1950 | Dome | 358/197 |
| 2,619,536 | 11/1952 | Cotsworth et al. | 358/188 |
| 2,652,447 | 9/1953 | Crosby | 358/197 |
| 2,811,580 | 10/1957 | Avins | 358/31 |
| 2,901,533 | 8/1959 | Keizer | 358/197 |
| 3,358,246 | 12/1967 | Bensasson | 358/196 |

FOREIGN PATENT DOCUMENTS

| | | |
|---|---|---|
| 718753 | 11/1954 | United Kingdom . |
| 753030 | 7/1956 | United Kingdom . |
| 957047 | 5/1964 | United Kingdom . |
| 1013859 | 12/1965 | United Kingdom . |
| 1129241 | 10/1968 | United Kingdom . |
| 1196194 | 6/1970 | United Kingdom . |
| 1515736 | 6/1978 | United Kingdom . |

Primary Examiner—John C. Martin
Attorney, Agent, or Firm—P. J. Rasmussen; W. H. Meagher; W. B. Yorks, Jr.

[57] ABSTRACT

A signal separation network is provided which accomplishes the functions of a sound take-off network and intercarrier sound trap in a single network. A common detector produces detected composite video and intercarrier sound signals. Circuitry is provided for processing the composite video signal, and a separate circuit is provided for processing sound information. The signal separation network has an input responsive to the detected composite video and intercarrier sound signals, a first output terminal coupled to the input of the video processing circuitry, and a second output terminal coupled to the input of the sound processing circuitry. The network is characterized by a transfer function which exhibits a dominant zero approximately at the intercarrier sound frequency at the first output terminal, which provides trapping of the intercarrier sound signal in the path to the video processing circuitry. The network is also characterized by a transfer function at the second output terminal which exhibits a dominant pole substantially at the intercarrier sound frequency and a zero at a lower frequency so as to peak the response at the second terminal around the intercarrier sound frequency. The intercarrier sound signal is therefore prefiltered by the bandpass characteristic at this second terminal and is then applied to the sound processing circuitry. The network may be arranged in either a series tuned or a bridged-T configuration, and may also be arranged so as to exhibit a zero in the transfer function at the second output terminal which provides attenuation of mid-band video signals in the sound channel.

9 Claims, 8 Drawing Figures

SIGNAL SEPARATION NETWORKS

This invention relates to signal separation networks and, in particular, to tuned circuit networks which separate composite video and intercarrier sound signals from a common signal path in a television receiver.

In color television receivers of the intercarrier sound variety, the sound and picture intermediate frequency signals may be amplified in a common signal processing stage. The composite video signal is then detected in an amplitude modulation detector, and an intercarrier sound signal is detected by mixing the picture carrier and the frequency-modulated sound carrier.

When an envelope detector is used for video detection, the sound carrier is usually coupled to the intercarrier sound detector prior to video detection. The sound carrier is then removed from the common signal path by a trap circuit before the remaining video information is applied to the envelope detector. This is because the envelope detector operates nonlinearly, and would otherwise intermodulate the sound carrier and the color subcarrier signal, resulting in the production of interference patterns in the reproduced television image.

When a synchronous demodulator is used for video detection, it is generally not necessary to remove the sound carrier from the common signal path prior to detection. This is due to the substantially linear operation of the synchronous demodulator, which can also be used to mix the sound and picture carriers. The synchronous demodulator will thus produce both the composite video signal and the intercarrier sound signal at a single output terminal.

Subsequent to the common detection of the composite vide and intercarrier sound signals, it is necessary to separate the two signals so that the sound and video information may be further processed and reproduced. The intercarrier sound signal must be removed from the video signal to again prevent possible intermodulation of the video and intercarrier sound signals during the processing of the composite video signal. Similarly, the video information must be eliminated from the intercarrier sound signal to prevent the generation of intermodulation and harmonic distortion in the sound channel.

In typical arrangements of the prior art, the detected intercarrier sound and video signals are coupled to the sound processing circuitry by a sound take-off network. The sound take-off network may exhibit a certain amount of selectivity at the intercarrier sound frequency so as to suppress the video signal components relative to the intercarrier sound signal. The intercarrier sound signal is then usually applied to a bandpass filter, which further attenuates the video signal components. The resultant bandpassed signal can then be processed without undesirable intermodulation of the video and intercarrier sound signals.

The detected intercarrier sound and video signals are also coupled to the luminance and chrominance processing circuits by way of a signal path which includes an intercarrier sound trap circuit. The video signals may then be processed without the generation of undesirable intermodulation between the sound and video signals, one form of which is the visible beat pattern which is caused by intermodulation of the intercarrier sound and chrominance subcarrier signals.

In accordance with the principles of the present invention, a signal separation network is provided which accomplishes the functions of the sound take-off network and intercarrier sound trap in a single network. A common detector produces detected composite video and intercarrier sound signals. Circuitry is provided for processing the composite video signal, and a separate circuit is provided for processing sound information. The signal separation network has an input responsive to the detected composite video and intercarrier sound signals, a first output terminal coupled to the input of the video processing circuitry, and a second output terminal coupled to the input of the sound processing circuitry. The network is characterized by a transfer function which exhibits a dominant zero approximately at the intercarrier sound frequency at the first output terminal, which provides trapping of the intercarrier sound signal in the path to the video processing circuitry. The network is also characterized by a transfer function at the second output terminal which exhibits a dominant pole substantially at the intercarrier sound frequency and a zero at a lower frequency so as to peak the response at the second terminal around the intercarrier sound frequency. The intercarrier sound signal is therefore prefiltered by the bandpass characteristic at this second terminal and is then applied to the sound processing circuitry.

It has been found that video signals at two frequencies are especially troublesome in the sound channel. Signals in the vicinity of the color subcarrier frequency can intermodulate with the intercarrier sound signal to cause low frequency interference in the sound channel, and video signals at half the intercarrier sound frequency can create harmonic distortion interference. In accordance with a further aspect of the present invention, the signal separation network is arranged to provide trapping at the color subcarrier frequency at the second output terminal so as to substantially remove signals about this frequency from the intercarrier sound signal. The signal separation network may also be arranged to provide trapping at the half-intercarrier sound frequency at this output terminal. The network may be further arranged to provide attenuation at both these frequencies by locating a zero in the transfer function at the second output terminal at a frequency intermediate these two troublesome frequencies.

In accordance with yet another aspect of the present invention, a signal separation network is provided which is arranged in a bridged-T configuration. The network provides prefiltering of the intercarrier sound signal at an output terminal located on the shunt leg of the network, and may be tuned to exhibit virtually an infinite Q at the intercarrier sound frequency at the video signal output terminal. The network may also be arranged to provide trapping at the color subcarrier or half-intercarrier sound frequency at the shunt leg output terminal from which the intercarrier sound signal is coupled to the sound processing circuitry.

Figure 5:
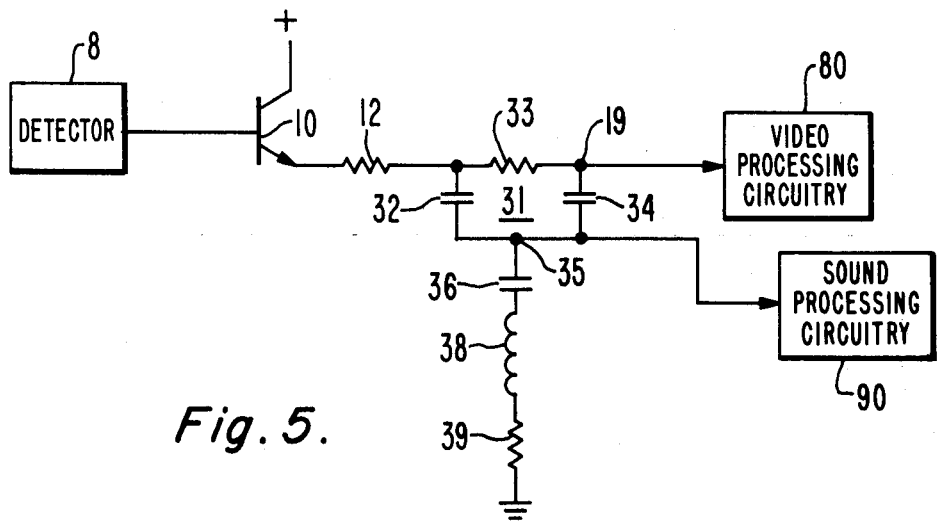
Figure 6:
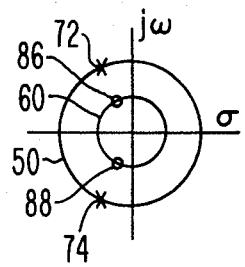

FIG. 5 illustrates, partially in schematic diagram form and partially in block diagram form, a signal separation network arranged in a bridged-T configuration in accordance with the principles of the present invention which attenuates mid-band video signals in the intercarrier sound signal path; and FIG. 6 is an S-plane plot illustrating a transfer function of the signal separation network of FIG. 5.

Figure 1:
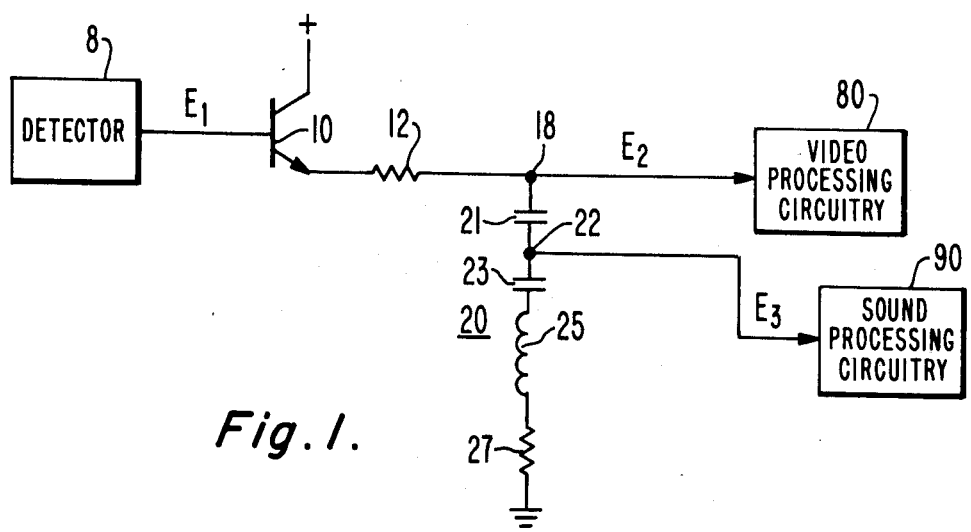
FIG. 1 illustrates, partially in block diagram form and partially in schematic diagram form, a signal separation network constructed in accordance with the principles of the present invention which attenuates mid-band video signals in the intercarrier sound signal path.

Referring to FIG. 1, a signal separation network 20 is shown coupled to the signal path between a detector 8 and video processing circuitry 80. The output signal $E_1$ of the detector 8 comprises a composite video signal and an intercarrier sound signal. This output signal is applied to the base of an emitter follower coupled transistor 10, which may, for instance, be the output stage of the detector 8. The output signal at the emitter of the transistor 10 is applied to the input of video processing circuitry 80, which processes the composite video signal $E_2$ for display on a cathode ray tube (not shown). The resistor 12 represents the source impedance seen by the signal separation network 20 and the video processing circuitry 80.

The signal separation network 20 is coupled between a point 18 of the signal path to the video processing circuitry 80 and a point of reference potential (ground). The network comprises the serial combination of capacitors 21 and 23, an inductor 25, and a resistor 27. The resistor 27 may represent the coil losses of inductor 25, or may be a discrete circuit element. A bandpassed intercarrier sound signal $E_3$ is developed at the junction 22 of capacitors 21 and 23 and is applied to the input of sound processing circuitry 90.

Figure 2A:
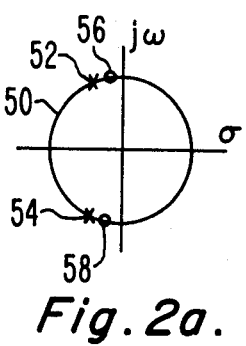
FIG. 2a and 2b are S-plane plots illustrating transfer functions of the signal separation network of FIG. 1.
Figure 2B:
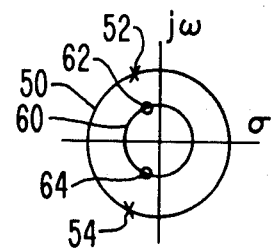

The operation of the signal separation network 20 may be understood by referring to the S-plane plots of FIGS. 2a and 2b. The signal separation network may be described mathematically by transfer functions which represent the effects of the network at points 18 and 22. The transfer function at point 18 is the ratio of the composite video signal $E_2$ to the detected signal $E_1$, and is a mathematical expression containing zeroes in its numerator and poles in the denominator. Similarly, the transfer function at point 22 is the ratio of the signal $E_3$ to $E_1$. The poles and zeroes of the respective transfer functions are shown in FIGS. 2a and 2b, respectively.

In the S-plane plot of FIG. 2a, the transfer function at point 18 is seen to contain a pole 52 and a zero 56 at the intercarrier sound frequency, both of which are located on a circle 50 which intersects the $j\omega$ axis (the frequency axis) substantially at the intercarrier sound frequency. The transfer function also contains a complementary pole-zero pair 54, 58 mirroring the pole zero pair 52, 56 about the $\sigma$ axis. At the intercarrier sound frequency on the $j\omega$ axis, the zero 56 is closer to the axis and will predominate over the pole 52. This means that, at the point 18, signals at the intercarrier sound frequency will be greatly attenuated, resulting in the trapping out of the intercarrier sound signal from the signals that are coupled from detector 8 to the input of the video processing circuitry 80. Therefore, only composite video signals are applied to the video processing circuitry. The separation network 20 thus operates as an intercarrier sound trap for signals at point 18.

The transfer function at point 22, which is shown in the S-plane plot of FIG. 2b, exhibits the same pole-pair 52, 54 as FIG. 2a. However, the zeroes 62, 64 in the transfer function are seen to be located adjacent to the $j\omega$ axis on a lower frequency circle 60. At the intercarrier sound frequency, indicated by the intersection of circle 50 with the $j\omega$ axis, pole 52 will predominate over zero 62, thereby producing a peaked response at point 22 at the intercarrier sound frequency. The proximity of zero 62 to the lower frequency intersection of circle 60 with the $j\omega$ axis causes attenuation about this lower frequency at point 22. The separation network 20 thus operates as a bandpass filter for the intercarrier sound signal at point 22, relative to the lower frequency video signals. If further selectivity of the intercarrier sound signal is desired, an additional intercarrier sound bandpass filter may be inserted in the signal path at the input to the sound processing circuitry 90. In that case, the prefiltering of the intercarrier sound signal by the separation network 20 provides an initial measure of selectivity which eases the performance requirements of the additional bandpass filter and results in improved intercarrier sound selectivity.

The frequency of the circle 60 in FIG. 2b, at which frequency on the $j\omega$ axis the lower frequency video signals are most sharply attenuated, may be chosen by selection of the proper ratio of capacitor 21 to capacitor 23. In the NTSC television system, the intercarrier sound signal frequency is 4.5 MHz, and the separation network 20 will be tuned to provide trapping about this frequency at point 18. It has been found that when the values of capacitor 21 and capacitor 23 are in the ratio of 1.778 to 1, the greatest attenuation at point 22 occurs about a frequency of 3.58 MHz, the frequency of the color subcarrier in the NTSC television system. When the value of capacitor 21 is reduced and that of capacitor 23 increases so that the ratio of the two capacitors is 1 to 3, attenuation will occur about a frequency of 2.25 MHz, which is half of the intercarrier sound frequency of 4.5 MHz. A ratio intermediate these two will result in attenuation at both 3.58 MHz and 2.25 MHz and maximum attenuation at an intermediate frequency, thereby reducing possible intermodulation of the 3.58 MHz color subcarrier with the 4.5 MHz intercarrier sound signal, as well as interference from harmonics of 2.25 MHz, in the sound channel. The designer may choose that ratio which provides the best performance in a particular television receiver.

Figure 3:
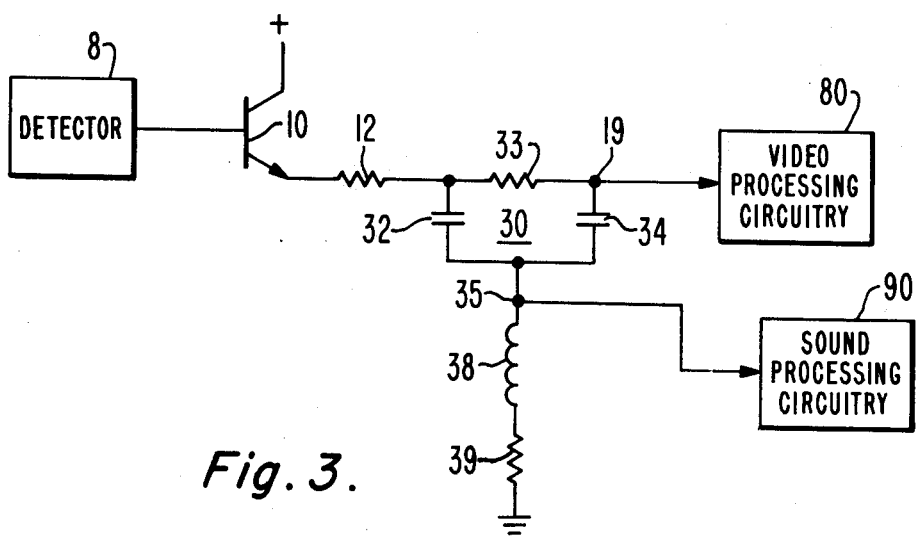
FIG. 3 illustrates, partially in block diagram form and partially in schematic diagram form, a signal separation network arranged in a bridged-T configuration in accordance with the principles of the present invention.

FIG. 3 illustrates a separation network 30 arranged in a bridged-T configuration in accordance with the principles of the present invention. Elements which appear in FIG. 1 are shown in FIG. 3 and bear the same reference numerals. The separation network 30 comprises a bridging resistor 33 coupled between source impedance 12 and point 19 at the input of video processing circuitry 80. Coupled in parallel with resistor 33 are series-coupled capacitors 32 and 34. An inductor 38 and a resistance 39 are coupled in series between point 35, which is the junction point of capacitors 32 and 34, and a point of reference potential (ground). The resistance 39 represents the coil losses of inductor 38, or may be a discrete resistor. The intercarrier sound signal is coupled to the sound processing circuitry 90 from point 35.

Figure 4A:
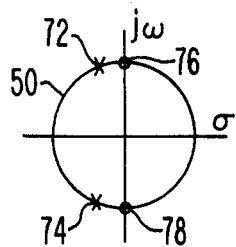
FIGS. 4a and 4b are S-plane plots illustrating transfer functions of the signal separation network of FIG. 3.
Figure 4B:
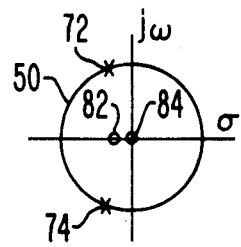

The poles and zeroes of the transfer functions at points 19 and 35 are shown in FIGS. 4a and 4b. In FIG. 4a, the transfer function at point 19 exhibits the pole pair 72, 74 on the intercarrier sound frequency circle 50 to the left of the $j\omega$ axis and the zero pair 76, 78 at the intersection of circle 50 with the $j\omega$ axis. The location of the zero pair 76, 78 is controlled by properly proportioning the resistance of the parallel circuit elements with the resistance of the shunt leg circuit elements.

Due to its closer proximity to the jω axis, the zero 76 will predominate over pole 72, and its location on the jω axis indicates virtually infinite attenuation at that frequency. Therefore, at point 19, the separation network 30 will act as a virtually infinite Q trap, sharply attenuating the intercarrier sound signal in the video signal path to the video processing circuitry 80.

At point 35, the intercarrier sound take-off point of the separation network 30, FIG. 4b shows the location of the same pole pair 72, 74 as in FIG. 4a. The pole 72 will dominate at the intercarrier sound frequency (the intersection of circle 50 with the jω axis), whereby peaking the response at point 35 at the intercarrier sound frequency. The zeroes 82, 84 in FIG. 4b are seen to be located at the origin, which indicates sharp attenuation of very low frequency signals. Thus, the response at point 35 will be peaked about the intercarrier sound frequency and will roll off toward maximum attenuation at D.C.

The separation network 31 of FIG. 5 is identical to that of FIG. 3, with the exception of the addition of capacitor 36, which is coupled in series between point 35 and inductor 38. Separation network 31 exhibits the same transfer function at point 19 as the network 30 of FIG. 3, the poles and zeroes of which are shown in FIG. 4a. However, the inclusion of capacitor 36 results in a relocation of the zeroes of the transfer function at point 35, as shown in FIG. 6. There it is seen that zeroes 86 and 88 are located on circle 60, which intersects the jω axis in the middle of the video frequency range. By proper selection of the value of capacitor 36, zeroes 86, 88 and the circle 60 can be located at the color subcarrier frequency, half the intercarrier sound frequency or at some intermediate frequency. As in the case of the separation network of FIG. 1, these locations will result in maximum attenuation at those frequencies which are sources of interfering signals in the sound channel. Therefore, it may be seen that the separation network 31 of FIG. 5 provides high, virtually infinite Q trapping of the intercarrier sound signal in the video signal path at point 19, and a peaked response about the intercarrier sound frequency at the sound take-off point 35, with substantial attenuation of those color subcarriers and/or mid-band video signals which cause intermodulation and harmonic distortion in the sound channel.

What is claimed is:

1. In a television receiver having a common detector for detecting the composite video and intercarrier sound signal components of a television signal, said video signal components occupying a first range of frequencies and said intercarrier sound signal components occupying a second range of frequencies exclusive of said first range, video signal processing circuitry having an input, sound signal processing circuitry having an input, and a signal path for coupling said detected composite video and intercarrier sound signal components to the input of said video signal processing circuitry; a signal separation network comprising:

first, second, and third reactive elements coupled in series between a point on said signal path and a point of reference potential, said network having a terminal intermediate said signal path and reference potential connections which is coupled to the input of said sound processing circuitry, wherein said separation network is tuned so as to exhibit, at said signal path point, a trap response within said second range of frequencies; and at said intermediate terminal, a peak response, within said second range of frequencies and a trap response within said first range of frequencies.

2. In a television receiver having a common detector for detecting video frequency signal components occupying a given range of frequencies and an intercarrier sound signal having a given frequency, means, having an input, for processing said video frequency signal components, means for coupling said detected signals to said input of said video signal processing means, and means, having an input, for processing said intercarrier sound signal, a network for separating said detected video frequency and intercarrier sound signals comprising:

a series tuned circuit having a first end terminal coupled to said input of said intercarrier sound signal processing means and a second end terminal coupled to a point of reference potential, said circuit being tuned to provide, at said first end terminal, a peaked response at said intercarrier sound frequency and a first minimum response at a frequency within said given range of frequencies, and a reactive impedance coupled between said first end terminal and a point on said video signal coupling means and tuned in cooperation with said series tuned circuit to provide at said point on said coupling means, a second minimum response at said intercarrier sound frequency.

3. The arrangement of claim 2, wherein said video frequency signal range includes a color subcarrier frequency, said series tuned circuit includes a second reactive impedance, and said first-named and said second reactive impedances are proportioned to cause said first minimum response to occur at approximately said color subcarrier frequency.

4. The arrangement of claim 2, wherein said video frequency signal range includes a frequency which is half the intercarrier sound signal frequency, said series tuned circuit includes a second reactive impedance, and said first-named and said second reactive impedances are proportioned to cause said first minimum response to occur at approximately said frequency which is half the intercarrier sound signal frequency.

5. In a television receiver having a common detector for detecting video frequency signal components contained within a range of frequencies extending from D.C. to a first frequency and an intercarrier sound signal at a second frequency outside said range of frequencies, means, having an input, for processing said video frequency signal components, and means, having an input for processing said intercarrier sound signal; a network for separating said detected video and intercarrier sound signals comprising:

a tuned circuit, coupled between said detector and a point of reference potential, and having an input responsive to said detected video and intercarrier sound signals, a first output terminal coupled to the input of said video processing means, and a second output terminal coupled to the input of said intercarrier sound signal processing means, said tuned circuit exhibiting, at said first output terminal, a transfer function having a dominant zero at said second frequency and exhibiting, at said second output terminal, a transfer function having a dominant pole at said second frequency and a dominant zero at an intermediate location within said range of frequencies.

6. In a television receiver having a common detector for producing, at an output, detected video frequency signal components and an intercarrier sound signal occupying a given range of frequencies exclusive of said video frequency signal components, means, having an input terminal, for processing said video frequency signal components, and means, having an input, for processing said intercarrier sound signal; a network for separating said video and intercarrier sound signal components comprising:

first and second parallel signal paths coupled between the output of said detector and the input terminal of said video signal processing means and including a reactive impedance element of one sign;

a third signal path, including a reactive impedance element of an opposite sign, coupled between an intermediate point on said first signal path and a point of reference potential, and means for coupling the signal developed across said reactive impedance element in said third signal path to the input of said intercarrier sound signal processing means, said first, second and third signal paths comprising a tuned circuit tuned to exhibit a transfer function having a zero within said given range of frequencies at said input terminal, and exhibiting a pole within said given range of frequencies at the junction of said third signal path and said coupling means, wherein said video frequency signal components occupy a second given range of frequencies, and said third signal path further includes means for producing a minimum response at a frequency included within said second given range of frequencies at said junction.

7. In a television receiver having a common detector for producing, at an output, detected video frequency signal components and an intercarrier sound signal, means, having an input terminal, for processing said video frequency signal components, and means, having an input, for processing said intercarrier sound signal; a network for separating said video and intercarrier sound signal components comprising:

first and second parallel signal paths coupled between the output of said detector and the input terminal of said video signal processing means;

a third signal path, including an impedance element, coupled between an intermediate point on said first signal path and a point of reference potential, and means for coupling the signal developed across said impedance element in said third signal path to the input of said intercarrier sound signal processing means, said first, second and third signal paths comprising a tuned circuit for attenuating said intercarrier sound signal at said input terminal, wherein said video frequency signal components occupy a given range of frequencies including a color subcarrier frequency, and that portion of said third signal path which is coupled between the junction of said coupling means and said third signal path and said point of reference potential is tuned to provide attenuation at approximately said color subcarrier frequency at said junction.

8. In a television receiver having a common detector for producing, at an output, detected video frequency signal components and an intercarrier sound signal, means having an input terminal, for processing said video frequency signal components, and means, having an input, for processing said intercarrier sound signal; a network for separating said video and intercarrier sound signal components comprising:

first and second parallel signal paths coupled between the output of said detector and the input terminal of said video signal processing means;

a third signal path, including an impedance element, coupled between an intermediate point on said first signal path and a point of reference potential, and means for coupling the signal developed across said impedance element in said third signal path to the input of said intercarrier sound signal processing means, said first, second and third signal paths comprising a tuned circuit for attenuating said intercarrier sound signal at said input terminal, wherein said video frequency signal components occupy a given range of frequencies including a frequency which is half the frequency of said intercarrier sound signal, and that portion of said third signal path which is coupled between the junction of said coupling means and said third signal path and said point of reference potential is tuned to provide attenuation at approximately said half intercarrier sound signal frequency at said junction.

9. In a television receiver having a common detector for producing, at an output, detected video frequency signal components and an intercarrier sound signal occupying a given frequency range, means, having an input terminal, for processing said video frequency signal components, and means, having an input, for processing said intercarrier sound signal; a bridged-T network for separating said video and intercarrier sound signal components comprising:

a first signal path, including a resistive impedance, and a second signal path, including a first reactive impedance of one sign, coupled in parallel between the output of said detector and the input terminal of said video signal processing means;

a third signal path, including a second reactive impedance of an opposite sign, coupled between said second signal path and a point of reference potential, and having a terminal at which said intercarrier sound signal is developed; and means for coupling said third signal path terminal to the input of said intercarrier sound signal processing means, wherein said first, second, and third signal paths comprise a tuned circuit for attenuating said intercarrier sound signal at the input terminal of said video signal processing means and for peaking the response at said third signal path terminal at a frequency within said given frequency range, wherein said video frequency signal components occupy a second given range of frequencies, and said third signal path includes a third reactive impedance serially coupled between said third signal path terminal and said point of reference potential, wherein that portion of said third signal path which is coupled between said third signal path terminal and said point of reference potential comprises a circuit which is tuned to produce a point of maximum attenuation at said third signal path terminal at a frequency which is included within said second given range of frequencies.

* * * * *